United States Patent [19]

Weaver et al.

[11] 4,341,725

[45] Jul. 27, 1982

[54] MOLDING REFRACTORY AND METAL SHAPES BY SLIP-CASTING

[76] Inventors: Gerald Q. Weaver, Mountain Rd., Princeton, Mass. 01541; Bruce G. Nelson, Box 42, West Wardsboro, Vt. 05360

[21] Appl. No.: 150,781

[22] Filed: May 19, 1980

Related U.S. Application Data

[63] Continuation-in-part of Ser. No. 860,129, Dec. 13, 1977, abandoned.

[51] Int. Cl.$^3$ .............................................. C04B 35/02
[52] U.S. Cl. .......................................... 264/28; 264/86
[58] Field of Search ............................... 264/28, 63, 86

[56] References Cited

U.S. PATENT DOCUMENTS

| | | | |
|---|---|---|---|
| 2,765,512 | 10/1956 | Nesbit | 264/28 |
| 2,893,102 | 7/1959 | Maxwell | 264/28 |
| 2,948,935 | 8/1960 | Carter | 164/26 |
| 3,205,043 | 9/1965 | Taylor | 423/345 |
| 3,567,520 | 3/1971 | Dennery | 427/115 |
| 3,576,653 | 4/1971 | Miller | 106/38.9 |
| 3,808,143 | 4/1974 | Gardner | 252/82 |
| 3,885,005 | 5/1975 | Downiny | 264/28 |

OTHER PUBLICATIONS

Knollenberg, "Urea as an Ice Nucleant for Supercooled Clouds," Tech. Note No. 9, University of Chicago, 4-1-65.

*Primary Examiner*—John A. Parrish
*Attorney, Agent, or Firm*—Arthur A. Loiselle, Jr.

[57] ABSTRACT

Dense, essentially flawless, complex refractory or metal shapes are formed by preparing a casting slip of fine refractory or metal powder wherein the slip liquid preferably contains 0.1 to 10% by weight of a hydrogen bond forming compound, casting the slip, freezing the cast slip, removing the solid form from the mold, drying, and finally firing to sinter the refractory or metal particles.

6 Claims, No Drawings

MOLDING REFRACTORY AND METAL SHAPES BY SLIP-CASTING

This is a continuation-in-part of application Ser. No. 860,129 filed December 13, 1977 now abandoned.

BACKGROUND OF THE INVENTION

1. Field of the Invention

The invention relates to processes for fabricating refractory or metal shapes. More specifically the invention is concerned with the molding of highly dense refractory and metal shapes by freeze casting and freeze drying.

2. Prior Art Statement

The following patents are representative of the most relevant prior art known to the Applicants at the time of filing of the application:

| U.S. Pats. | | |
|---|---|---|
| 2,765,512 | October 9, 1956 | R. A. Nesbit |
| 2,893,102 | July 7, 1959 | W. A. Maxwell et al |
| 2,948,935 | August 16, 1960 | R. T. Carter |
| 3,567,520 | March 2, 1971 | Dennery et al |
| 3,576,653 | April 27, 1971 | D. G. Miller et al |
| 3,808,143 | April 30, 1974 | T. R. Gardner |
| 3,885,005 | May 20, 1975 | H. L. Downing et al |

OTHER PUBLICATIONS

"Urea as an Ice Nucleant for Supercooled Clouds" by Robert G. Knollenberg, Technical Note No. 29, Cloud Physics Laboratory, The University of Chicago, Chicago, Ill., Apr. 1, 1965.

Workers in the powdered metallurgy and refractory arts have been persistent over the years in their efforts to create improved methods for making high strength and high quality metal and refractory articles of very complex shape. When the shapes are simple and optimum strength is not required, powder is pressed at room temperature, removed from the mold and sintered; if maximum strength is a prerequisite, then the shape is hot-pressed. These methods, particularly in the latter situation, are not suitable for refractory or metal articles of intricate configuration. The ancient art of slip casting is probably the most effective way of forming, however it too has its attendant problems as a result of degree of complexity of the shape being molded and the physical properties, particularly mechanical strength, which result from the slip casting technique.

A major problem associated with slip casting is the damage done to an intricately shaped casting when attempts are made to remove the green casting from the mold, and the high cost in making extremely complex molds which can be disassembled.

The Nesbit reference teaches a method that allows reasonably successful manufacture of ceramic articles of relatively complex shape. According to Nesbit, a non-absorbing mold and/or core is prepared from, for example, a rubber latex. A very thick casting slip i.e. one containing only enough water to render it castable, is made and poured into the flexible mold. The casting is frozen. The mold is then peeled away from the frozen cast shape without damage thereto because of the inherent strength of the frozen body. Nesbit then thaws and dries the casting, apparently at room temperature and pressure, and finally fires the dried ceramic shape. It is also necessary that the amount of water in the original cast slip be low enough that ice crystals, large enough to crack the frozen shape, do not form. This Nesbit accomplishes by partially drying the casting in the mold prior to freezing. The Nesbit teachings are directed at ceramic ware such as plaques, vases, figurines, jars, and the like, and not too high strength structural refractories.

A variant on the freeze casting process is that of Downing et al. A casting slip is prepared from relatively coarse (70% coarser than 200 mesh) refractory powder, colloidal silica sol, and water. The slip is evacuated to remove entrapped air and cast into an appropriately shaped non-absorbing mold. The mold and its contents are chilled to about 15° F. which causes the colloidal silica to irreversibly precipitate, forming a strong bond between the refractory particles or grains. The casting and mold are then subjected to a temperature as low as −80° F. which causes the moisture in the casting to freeze rapidly. The frozen shape is removed from the mold and is very strong. It is then heated to about 200° F. to thaw the ice and to drive off the water. Finally, the dried, green shape is fired at 2000°–3500° F.

A further modification of freeze casting involves freeze drying in vacuum so as to cause sublimation of the material to be removed. This process is taught by Dennery et al and is specifically directed at freeze drying of powdered metal slip. In its relevant parts, Dennery et al forms a paste from a liquid, a soluble material, and an insoluble organic material viz. fine silver and nickel powders, is formed into a layer and quickly frozen at −60° C. The frozen material is lyophilized under vacuum for 12 hours (optionally with the aid of infra red radiation). The layer thus formed is porous. A similar process is described by W. A. Maxwell et al, "Preliminary Investigation of the 'Freeze Casting' Method for Forming Refractory Powders", National Advisory Commission Aeronautical Research Memorandum E53L51 (1954) and the W. A. Maxwell et al patent reference cited above, applied to the slip casting of ceramic shapes. A thick casting slip, i.e. low in water content, is made using aluminum oxide, titanium carbide or the like which is de-aerated by the simultaneous application of vibration and vacuum. The slip is then injected and packed into a mold. The slip and mold are then frozen in a $CO_2$ bath, removed therefrom, and subjected to a vacuum of 2 mm for 4 hours at a temperature at least below that of the casting. The dried, green casting is then sintered at about 2300° C.

Also relevant to the present invention are the several known methods of forming absorbent and non-absorbent casting molds such as that taught by Carter which is a "lost wax" process of sorts. Carter first forms a wax pattern, coats the pattern with a refractory powder mix, sets the powder in a manner dependent on the type of mix, and then removes the wax pattern by the application of heat or by utilizing a solvent for the wax.

Another molding technique which relates to one embodiment of the invention involves the use of decomposable molds such as those described by Miller et al and Gardner. Miller et al form ceramic cores by mixing a ternary calcium oxide based composition e.g. Ca-$Al_2O_3$—$SiO_2$ with a lubricant and a temporary binder, forms the mix into the desired shape and fires it at 2425° F. The core is used for casting, and then removed from the cooled casting by soaking in 6 N HCl. Gardner is not specifically related to slip casting but describes the removal of gypsum deposits by dissolving said deposits with an aqueous solution of a salt of an alpha-hydroxy carboxylic acid. Plaster of Paris molds, commonly used for slip casting, are essentially gypsum after the plaster of Paris has been mixed with water and dried; Gardner's teachings could be effectively used to remove a plaster of Paris mold after slip casting.

The Knollenberg paper is in no way related to the slip casting of complex ceramic or refractory shapes; its relevance to the present invention will become apparent as the invention is described in detail below. Knollenberg is concerned with the so-called cloud seeding phenomenon. Experiments are described wherein urea is used as a nucleating agent for supercooled clouds. Fine particles of urea are distributed in a moisture laden atmosphere, such as a cloud. The urea particles cause the minute suspended water droplets to condense or associate to form large drops e.g. 1 mm, which then form ice crystals and precipitate as snow. Pages 2 through 6 present a reasonable summary of the paper, including the interaction between the urea and the suspended tiny droplets of moisture. The general objection of cloud seeding with any nucleating agent is to form large crystals of water so that precipitation occurs.

SUMMARY OF THE INVENTION

The invention is a method of forming essentially scar free, high strength refractory and metal articles utilizing known slip casting techniques, which includes the step of freeze drying, modified by the addition to the slip of certain amounts of a hydrogen bond forming material. The presence of a hydrogen bond forming material dissolved in the slip, prevents the formation of large crystals of ice when the cast slip is frozen, a problem which is inherent in the prior art methods. Without such a material, the process of freezing the slip creates ice crystals as large as $\frac{1}{4}$ to $\frac{1}{2}$ long inside and on the surface of the casting. After freeze drying and firing, the casting contains many scars or planes of weakness as a result of this formation of large crystals. The hydrogen bond forming material prevents large crystal formation and causes the water to freeze in the form of very minute crystals of the order of about 0.02–0.05 mm.

Other hydrogen bond forming materials which prevent the formation of large ice crystals are: n-propyl sulfoxide, triethanolamine, dimethyl sulfoxide, methanol, acetamide, formic acid, dextrose, hexamethylene diamine, pyridine, formamide, urea, hydrogen peroxide, acetone, raffinose, tetrahydrofaran, guanidine carbonate, dimethyl formamide, glycine, glycerol, ethanol, acetonitrile, agar, hexamethylene tetramine, oxalic acid, and isobutanol. These materials were evaluated for their ability to prevent the formation of large ice crystals, by adding to the slip liquid, varying amounts creating solutions of from 0.6 to 2.0 molal. Consonant with the solubility characteristics of the various compounds, they were more effective as the concentration of the compound was increased. However, as a general matter, substantial quantities of organic materials can cause problems when the cast piece is fired. Therefore the amount of hydrogen bond forming material should be kept as low as possible, with a range of from 0.1 to 10% by weight of the total amount of liquid used in the slip being preferred.

While the reason of large ice crystals has not been established, it is believed that this is brought about by the materials hydrogen bonding with water molecules which in turn destroys at least some of the natural molecular order found in water due to hydrogen bonding of the water molecules themselves.

Large crystal formation may be of no consequence, except from an esthetic point of view, in such articles as those of Nesbit so long as the crystals are not large enough to cause cracks but, the scars or planes or weakness are important, and even critical, if the articles end use requires a high degree of mechanical strength, e.g. structural refractories or refractory parts of a turbine such as those disclosed by Maxwell et al. Heretofore, essentially scar free, complex ceramic or refractory articles made by slip casting and freeze drying, have been unknown.

DESCRIPTION OF THE PREFERRED EMBODIMENTS

In its most preferred form, the present invention employs, as a major part thereof, the process of forming known as slip-casting. Slip-casting, in general, involves the preparation of a mixture of a liquid and a powder of such a consistency that it is pourable; the liquid usually being water and the powder a refractory or metal powder. The paste or casting slip is then poured into a mold which is moisture absorbent. The mold absorbs the water from the slip thus drying out and solidifying the paste into the desired shape; the green shape is then fired to sinter the metal or refractory particles.

There are numerous variants and elaborations of the basic slip casting process. Instead of casting a relatively fluid slip into an absorbent mold, a less fluid slip may be injection molded, the mixture may be vibrated into a mold, and so on. The term "slip casting" as used herein is intended to include all such methods.

Similarly, the more ordinary slip-casting involves a porous absorbent mold, but it is known to use non-absorbing molds, followed by freezing of the casting slip, removal of the frozen shape, thawing, drying, and finally firing to facilitate sintering; this is disclosed by Nesbit. Slip casting most commonly involves a slip composed of a ceramic or refractory powder which is ultimately sintered; however, the solid phase of the slip may be powdered silicon metal which is cast and formed in the same manner as a refractory powder based slip, but instead of simply being sintered, the cast shape is nitrided in the known manner. Alternatively, if the silicon carbide is the base material, a silicon carbide shape may be fabricated followed by the introduction of carbon into the pores of the piece, followed finally by siliconization in the known manner, such as that taught by Taylor in U.S. Pat. No. 3,205,043.

Likewise, freeze-drying methods such as that taught by Dennery et al, and Maxwell et al, the lost wax type process of Carter, and the use of decomposable molds as disclosed by Miller et al and Gardner, are all operable within the scope of the present invention by one skilled in the art and are intended to be included in the term "slip-casting".

In the ensuing example, the slip forming liquid is water. However, this should not be construed as a limitation. While water is the most desirable from a practical point of view, almost any liquid which is solvent for the hydrogen bond forming compound would be operable e.g. methyl alcohol, glycerol and the like. The hydrogen bond forming compound should be soluble in the slip liquid.

EXAMPLE I

A silicon carbide tube measuring 25.40 cm in length, 5.6 cm in outside diameter, and having a wall thickness of 1.61 cm, was formed as follows:

A casting slip was prepared by mixing the following materials in the quantities shown, and rolling in a jar mill for about 20 minutes:

| | |
|---|---:|
| silicon carbide (3 μm) | 6637.76 g |
| silicon carbide (100F) | 6637.76 g |
| water | 1659.44 g |
| sodium silicate | 9.29 g |
| urea | 55.76 g |

A casting mold was constructed which was made up of a Spauldite (resin impregnated kraft paper) tube which was 30.48 cm long and with an I.D. of 5.16 cm; a silicone rubber core 30.48 cm long, with an O.D. of 3.55 cm was molded around a 1.27 cm O.D. steel rod with threaded ends, and two aluminum end caps with threaded holes for threading onto the ends of the steel rod, the end cap having two small holes bored therein for the purpose of allowing the escape of mold lubricant when the mold is initially assembled; the caps also had a recess on one side, approximately the diameter of the silicon rubber core.

A heavy layer of petroleum jelly was applied to the recess in the bottom end cap, i.e. the one containing the two small holes. One threaded end of the silicon rubber core was coated with wax by dipping the threaded steel end in molten wax. The wax coated threaded end was then firmly screwed into the threaded hole in the bottom end cap until the end of the core was fully and tightly seated in the cap's recess. The small holes in the cap allowed the excess petroleum jelly to escape thus avoiding petroleum jelly oozing out around the upper part of the rubber core which would ultimately be in contact with the refractory slip. The two small holes in the bottom end cap were then plugged with wax. The sides of the bottom end cap were then coated with petroleum jelly and the paper tube was pushed onto the cap forming a water tight seal between the two.

About 820 g of the slip prepared above was passed through a 25 mesh screen. The paper tube with the bottom end cap and silicon rubber core in place, was vibrated while an amount of the screened slip was poured into the mold set-up to fill it about ¼ full; this was done while vibrating the mold. The rubber core was rotated in place to free entrapped air. The remainder of the mold was filled with slip while vibrating; the vibrating was continued for an additional 15 seconds after filling the mold. The top end cap was lubricated with petroleum jelly and screwed in place.

The assembled mold and its contents were placed in CCl$_3$F bath which was refrigerated to approximately −84.4° C. and allowed to remain for about 40 minutes. At this point the assembly was taken out of the bath and the frozen tube removed from the mold assembly, and placed in a Stokes vacuum furnace. The chamber was pumped down to about 100 m of Hg at room temperature; the vacuum was held for an estimated 17 hours.

The dried piece, which was free of ice crystal scars, was sintered by subjecting it to 1970° C. in an argon atmosphere. Finally the presintered tube was siliconized in a manner similar to that taught by Taylor in U.S. Pat. No. 3,205,043 i.e. the porous tube was impregnated with a furfural based material, heat treated to carbonize the organic material, and exposed to silicon metal at 2070° C. in a nitrogen environment.

The resulting product was a high strength refractory tube free of the flaws and planes of weakness which are inherent in prior art freeze drying processes.

EXAMPLE II

Silicon carbide tubes were made in the same manner as described in EXAMPLE I except that the slip composition was as follows:

| | |
|---|---:|
| silicon carbide (3 μm) | 6637.76 g |
| silicon carbide (100F) | 6637.76 g |
| water | 1659.44 g |
| sodium silicate | 9.29 g |
| dimethyl sulfoxide | 156.26 g |

The resulting dried tubes were free of flaw, i.e. scars, of a size that could be seen with the eye. The final siliconized and fired products were of very high strength throughout.

What is claimed is:

1. A method of slip-casting, comprising the steps of: forming an appropriately shaped slip-casting mold; preparing a casting slip; casting said slip into said mold; freezing the cast slip; drying said frozen casting; and firing the green shape; wherein the improvement comprises; incorporating in said casting slip, an amount of a hydrogen bond forming compound sufficient to prevent the formation, in said frozen casting, of ice crystal large enough to result in scars in the dried casting.

2. The method of claim 1 wherein said hydrogen bond forming compound is one selected from the group consisting of n-propyl sulfoxide, triethanolamine, dimethyl sulfoxide, methanol, acetamide, formic acid, dextrose, hexamethylene diamine, pyridine, formamide, urea, hydrogen peroxide, acetone, raffinose, and tetrahydrofuran.

3. The method of claim 2 wherein said hydrogen bond forming compound is present in an amount of from about 0.1 to about 10% by weight of the total amount of liquid in said casting slip.

4. The method of claim 3 wherein said liquid is water and wherein at least part of the slip-casting mold is made up of a moisture permeable material.

5. The method of claim 3 including the step of removing the frozen casting from said slip-casting mold.

6. The method of claim 5 wherein at least part of said slip-casting mold is impervious to moisture.

* * * * *